(12) United States Patent  
Hallundbaek et al.

(10) Patent No.: US 8,823,379 B2
(45) Date of Patent: Sep. 2, 2014

(54) LOGGING TOOL (75) Inventors: Jørgen Hallundbaek, Graested (DK); Jimmy Kjaersgaard-Rasmussen, Birkerød (DK)

(73) Assignee: Welltec A/S, Allerod (DK)

(*) Notice: Subject to any disclaimer, the term of this patent is extended or adjusted under 35 U.S.C. 154(b) by 628 days.

(21) Appl. No.: 12/609,732

(22) Filed: Oct. 30, 2009

(65) Prior Publication Data

US 2011/0101983 A1 May 5, 2011

(51) Int. Cl.
*G01V 3/18* (2006.01)

(52) U.S. Cl.
USPC ........... 324/324; 324/375; 324/367; 324/519; 324/750.17; 324/686; 378/4; 378/59; 166/254.2

(58) Field of Classification Search
USPC .............. 166/250.01–250.17, 244.1–403; 702/1–199; 324/323–375; 343/703, 343/709, 718–719; 367/1–86; 73/152.01–152.62; 250/253–266
See application file for complete search history.

(56) References Cited

U.S. PATENT DOCUMENTS

| | | | | |
|---|---|---|---|---|
| 4,319,192 A | * | 3/1982 | Chemali et al. | 324/375 |
| 4,975,645 A | * | 12/1990 | Lucas | 324/324 |
| 6,577,700 B1 | * | 6/2003 | Fan et al. | 378/4 |
| 2006/0108112 A1 | * | 5/2006 | Simon | 166/254.2 |
| 2007/0133746 A1 | * | 6/2007 | Ortiz Aleman et al. | 378/59 |
| 2007/0152671 A1 | * | 7/2007 | Itskovich et al. | 324/367 |

* cited by examiner

*Primary Examiner* — Arleen M Vazquez
*Assistant Examiner* — Son Le
(74) *Attorney, Agent, or Firm* — Cozen O'Connor (57) ABSTRACT

The invention relates to a logging tool (1) for determining properties of a fluid (2) surrounding the tool arranged downhole in a casing (3) comprising a wall (4) and having a longitudinal extension. The logging tool has a substantially longitudinal cylindrical shape with a longitudinal axis and, when seen in cross-section, a periphery (5). Moreover, the logging tool comprises a plurality of electrodes (6) arranged spaced around the longitudinal axis in the periphery of the tool so that the fluid flows between the electrodes and the casing wall and a means for measuring the capacitance between two electrodes in all possible combinations giving n*(n−1)/2 capacitance measurements for n electrodes.

24 Claims, 11 Drawing Sheets

LOGGING TOOL

TECHNICAL FIELD

The present invention relates to a logging tool for determining properties of a fluid surrounding the tool arranged downhole in a casing comprising a wall and having a longitudinal extension. The logging tool has a substantially longitudinal cylindrical shape with a longitudinal axis and, when seen in cross-section, a periphery.

BACKGROUND

In order to optimise production, many attempts have been made within the oil industry to determine the flow properties, such as the volume flow rate, the hydro-carbon oil, water, and/or natural gas content in a well fluid, etc., of the fluid flowing in a casing down hole. The most common way of doing this is to take out samples above surface. However, logging tools able to determine the fluid properties have also been developed.

One example of a logging tool is shown in EP 0 372 598, in which two sets of eight electrodes are distributed around the circumference of the tool to be able to determine the fraction of gas in the oil and thus be able to determine the volume flow more accurately. In order to calculate the volume flow, the time between the measurement of substantially the same capacitance by the first and the second set of electrodes is calculated. Other electrodes in the form of guards are arranged between the electrodes. The guards are grounded to ensure that the electrical field is only distributed radially from the electrodes to the casing wall in each of the eight sections. These guards ensure that the measurements are independent of how the gas phase is distributed in the liquid phase, i.e. in the form of small bubbles, one large bubble, in the top of the casing, etc. Thus, only the fraction of gas in relation to the fraction of liquid is measured, and the capacitance measurements thus provide an average of the permittivity in one section. Subsequently, the fractions of gas measured in the eight capacitance measurements are used for determining the time between the measurement of substantially the same capacitance by the first and the second set of electrodes in order to estimate the volume flow.

DESCRIPTION OF THE INVENTION

It is an object of the present invention to wholly or partly overcome the above disadvantages and drawbacks of the prior art and provide an improved logging tool able to determine if a leak has occurred or if water flows in through perforations in the casing, and if so where, in order to seal off the leak or perforations.

It is an additional object to provide a logging tool capable of making enough capacitance measurements to create a high resolution image of the distribution of oil, gas, and/or water in the fluid in order to determine the position of an observation, such as a leak, much more accurately than by means of prior art tools.

Thus, it is also an object to provide a logging system able to determine the distribution of the oil, gas, and/or water phases, e.g. in terms of size and position, in the fluid more accurately than by means of prior art systems.

The above objects, together with numerous other objects, advantages, and features, which will become evident from the below description, are accomplished by a solution in accordance with the present invention by a logging tool for determining properties of a fluid surrounding the tool arranged downhole in a casing comprising a wall and having a longitudinal extension, the logging tool having a substantially longitudinal cylindrical shape with a longitudinal axis and, when seen in crosssection, a periphery, wherein the logging tool comprises:
  a plurality of electrodes arranged spaced around the longitudinal axis in the periphery of the tool so that the fluid flows between the electrodes and the casing wall, and
  a means for measuring the capacitance between two electrodes in all possible combinations giving $n*(n-1)/2$ capacitance measurements for n electrodes.

When measuring the capacitance between two electrodes in all possible combinations, enough data is gathered to produce a cross-sectional image of the fluid in which it is possible to see the size and position of each phase and see e.g. the water phase separate from the gas and/or oil phase, and thus to determine if a leak has occurred.

Having a tool measuring the capacitance between two electrodes in all possible combinations giving $n*(n-1)/2$ capacitance measurements for n electrodes makes it possible to obtain a sufficient number of measurements for creating a tomogram or a cross-sectional image of the flow.

In one embodiment, the tool may be free of electrical means grounded or having a fixed potential arranged as guards between the electrodes.

When ribs/guards that are grounded or ensure a fixed potential extend between the electrodes, the capacitance measurements are limited to a smaller area and do not extend all the way around the tool, measuring the capacitance for all of the well fluid. This leads to the assumption that the capacitance is distributed evenly in the radial direction. In the present invention, the lack of ribs/guards ensures that no such assumption is made, and the capacitance measurements may also represent an uneven distribution for all of the well fluid and may e.g. show if water is flowing in through a hole in the casing. Thus, a tomogram, i.e. an image of the distribution of the phases in the well fluid, can be calculated from the capacitance measurements.

In prior art logging tools, capacitance measurements have not been used to produce an image of the distribution of phases in the well fluid, but only to determine the fraction of gas in the fluid before calculating its volume flow.

In another embodiment, the logging tool may have a space between every two electrodes, which space is substantially filled up with a non-conductive means.

In another embodiment, the non-conductive means may be made of a substantially non-conductive material and/or a non-conductive gas, such as air.

In this way, the non-conductive means may be a non-conductive material, such as plastic, ceramics, or the like material, by a gas, or by a mixture of both the non-conductive material and the non-conductive gas.

The non-conductive material ensures that the electrodes are fixed at a certain position, but as the non-conductive means do not function as guards, they do not influence the measurements of the logging tool such as grounded guards or guards having a fixed potential.

In yet another embodiment, the logging tool may comprise a positioning device for determining a position of the logging tool along the longitudinal extension of the casing.

A tomogram shows the distribution of oil, gas, and/or water in the fluid at a specific time; however, the exact position where each tomogram was created cannot be deduced from the image itself. A positioning device makes it possible to determine the exact position and/or range of the tomogram, and thus the position of a leak or a similar radical change in the distribution of phases, such as water flowing in through perforations in the casing instead of oil. When thus being able to determine the position of a leak more accurately than in any available prior art solutions, a smaller liner or patch, which is easier to insert and less expensive, can be used to seal the leak. Furthermore, when using smaller patches, the risk of having to place one patch on top of another, thus decreasing the internal diameter of the well, is decreased.

In addition, when the leak has been sealed by a patch, the logging tool according to the present invention can be submerged into the well again to conduct new images of the flow in the area of the patch to ensure that the patch operation has been successful.

The positioning device may be a casing collar locator tool or a driving unit, such as a downhole tractor or a winch.

In one embodiment, the logging tool may comprise a centralisation device for centralising the logging tool in the casing.

Accordingly, more accurate measurements, and thus a more accurate image, can be obtained.

The centralisation device may be a driving unit, such as a downhole tractor, or anchors or arms projecting from the side of the tool.

In addition, the electrodes may be arranged in a front end of the tool at a distance from a tip of the tool of less than 25% of a total length of the tool, preferably less than 20%, and more preferably less than 15%.

When the electrodes are arranged near the tip of the tool, the measured flow is substantially unaffected and the measurements are thus more precise, since disturbing the flow increases the risk of creating tiny bubbles, which may be difficult to observe in the tomogram or the image.

In one embodiment, the logging tool may moreover comprise an orientation device for determining an orientation of the tool in the casing.

When being able to determine the orientation of the logging tool in relation to the casing wall, it is also possible to determine whether it is oil or water which is flowing in through the casing wall based on changes in the distribution of the phases detected further away from the leak or perforations.

The orientation device may be an accelerometer.

Moreover, the logging tool may comprise at least eight electrodes.

The means for measuring may provide a continuous measurement of the capacitance between the electrodes.

In one embodiment, the means for measuring may measure a capacitance between two electrodes at a rate of at least 1 measurement of the capacitance per second, preferably at least 5 measurements per second, and more preferably at least 10 measurements per second.

Moreover, the measurement of the capacitance between two electrodes may be performed at a potential (V) over two electrodes and with a frequency of at least 1 MHz.

The logging tool may also comprise a printing circuit directly connected with the electrodes without the use of cords or cables.

In addition, the electrodes may be positioned between the tip of the tool and the positioning device, or around the periphery of the tool with an equal distance between two adjacent electrodes.

The invention further relates to a method for using the logging tool according to the invention, comprising the steps of:
measuring the capacitance between two electrodes,
calculating the permittivity distribution, and
creating an image of the fluid flowing around the tool as a cross-sectional view transverse to the longitudinal extension of the tool.

In addition, the invention relates to a method for using the logging tool, comprising the steps of:
measuring the capacitance between two electrodes,
calculating the permittivity distribution from the following equations and Linear Back Projection:

$$\tilde{S}_{ij} = \frac{S_{ij}}{\sum_i S_{ij}}$$

$$\tilde{C}_{ij} = \frac{C_{ij} - C_{min}}{C_{max} - C_{min}}$$

$$\tilde{\epsilon}_{LBP} = \tilde{S}^T \tilde{C}$$

and
creating an image of the fluid flowing around the tool as a cross-sectional view transverse to the longitudinal extension of the tool.

The invention moreover relates to a method for determining a permittivity profile of a cross-sectional view of a fluid in an annulus using an electrode arrangement in the form of a set of electrodes arranged along a periphery of a cylindrical logging tool, comprising the steps of:
making a set of capacitance measurements constituted by one capacitance measurement for each combination of two electrodes from the set of electrodes,
determining the permittivity profile by:
providing a first calibration set ($\epsilon_{min}$, $C_{min}$) constituted by a set of capacitance measurements for each combination of two electrodes from the set of electrodes when the annulus is filled with a first known fluid,
providing a second calibration set ($\epsilon_{max}$, $C_{max}$) constituted by a set of capacitance measurements for each combination of two electrodes from the set of electrodes when the annulus is filled with a second known fluid different from the first known fluid,
providing a sensitivity matrix associated with the electrode arrangement, and
calculating the permittivity from the following equations:

$$\tilde{S}_{ijk} = \frac{S_{ijk}}{\sum_k S_{ijk}}$$

$$\tilde{C}_{ij} = \frac{C_{ij} - C_{min}}{C_{max} - C_{min}}$$

$$\tilde{\epsilon}_{LBP} = \tilde{S}^T \tilde{C}$$

The method may further comprise one or more of the following steps:
creating an image based on the calculations,
storing the set of capacitance measurements constituted by one capacitance measurement for each combination of two electrodes from the set of electrodes on a data storage media,
storing $\tilde{\epsilon}_{LBP}$ on a on a data storage media, and/or
storing a representation of $\tilde{\epsilon}_{LBP}$ on a data storage media.

In regard to the latter of these steps, the representation of $\tilde{\epsilon}_{LBP}$ stored may simply be the measured data in itself or it may be normalised using some sort of factor. The main object is to be able to reestablish $\tilde{\epsilon}_{LBP}$.

The invention also relates to any use of the logging tool according to the invention.

Finally, the invention relates to a detection system comprising the logging tool according to the invention and a calculation unit for processing capacitance measurements measured by the electrodes, and to a downhole system comprising the logging tool and a driving tool, such as a downhole tractor.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
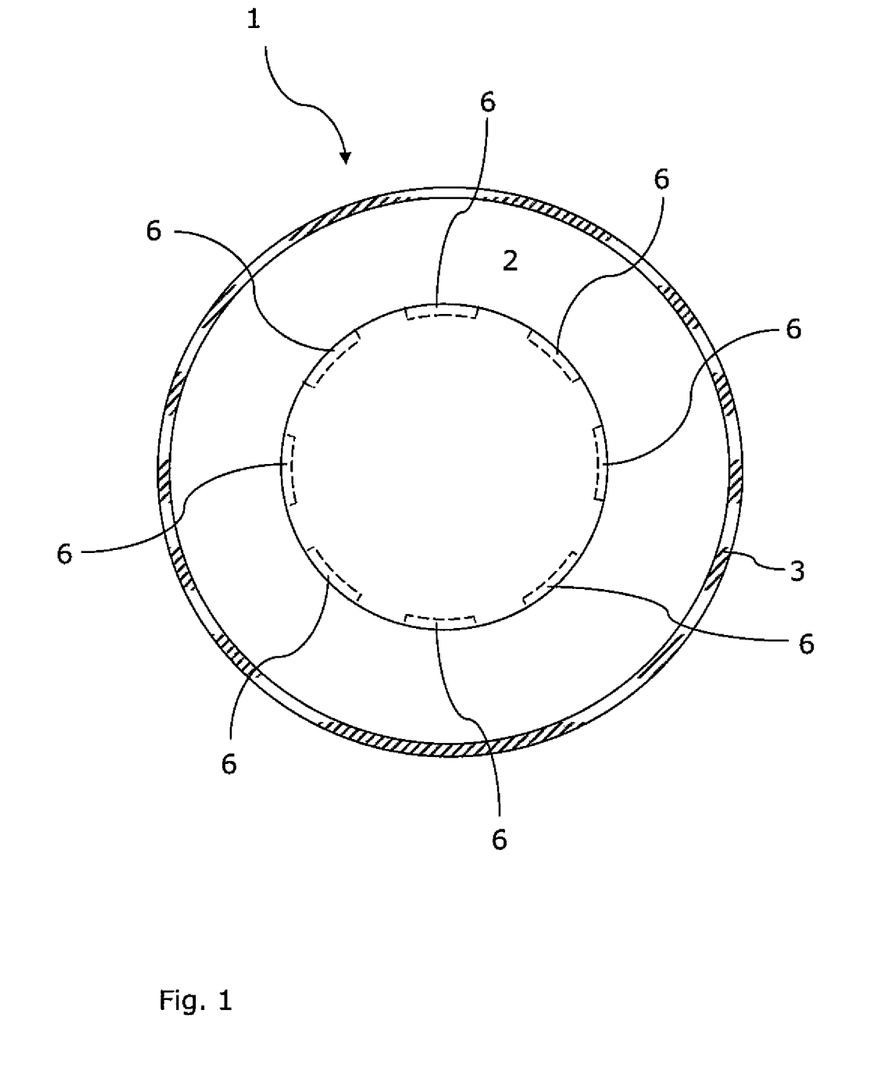
FIG. 1 shows a cross-sectional view of the logging tool transverse to the longitudinal extension of the tool.

The present invention relates to a logging tool 1 in which conduction of capacitance measurements between two electrodes 6 is made. In FIG. 1, a cross-sectional view of the logging tool 1 transverse to the longitudinal extension of the tool is shown. The logging tool 1 is surrounded by well fluid 2 as the logging tool is lowered into the well. In this case, the well is a casing 3 with a wall 4 defining a cross-sectional area between the wall and the outside of the tool 1. The tool 1 has a substantially cylindrical shape with a longitudinal axis and, when seen in cross-section, a periphery 5. Electrodes 6 are arranged in the periphery 5 of the tool and the fluid 2 thus flows between the electrodes and the wall 4. The electrodes 6 are arranged spaced apart and with an even distance between two adjacent electrodes creating a space between the electrodes two and two. The position of the electrodes 6 is illustrated by a dotted line.

The logging tool 1 is used to obtain an image of the distribution between the gas, oil, and/or water phases in the well fluid 2. To provide such an image, the tool 1 has means for measuring the capacitance between two electrodes 6 in all possible combinations giving n*(n−1)/2 capacitance measurements for n electrodes. When having eight electrodes 6, the image is created from 28 measurements of the capacitance. The capacitance measurements are sent to the surface where a calculation device calculates the permittivity distribution, and an image is created based on the permittivity distribution.

The space between every two electrodes is substantially filled up with a non-conductive means, in this case a plastic material. The non-conductive means ensures that the electrodes are fixed at a certain position, but as the non-conductive means do not function as guards, they do not influence the measurements of the logging tool in the way grounded guards or guards having a fixed potential would.

In a prior art tool, grounded ribs/guards or ribs/guards ensuring a fixed potential are positioned in the space between the electrodes, thus limiting the capacitance measurements to a smaller area. This may lead to the assumption that the capacitance is distributed evenly in the radial direction, which is not always the case. In the present invention, the ribs/guards have been replaced by non-conductive means preventing such assumption is made, just as the capacitance measurements may also show an uneven distribution for all of the well fluid and e.g. show if water is flowing in through a hole in the casing. Thus, a tomogram, i.e. an image of the distribution of the phases in the well fluid, can be calculated from the capacitance measurements.

The non-conductive means may be any suitable non-conductive material or a non-conductive gas, such as air. The non-conductive material may be any suitable material, such as ceramics or the like material, and the gas may be air. The non-conductive means may also be a combination of both non-conductive material and non-conductive gas.

The capacitance between two electrodes 6, e.g. i and j, depends on the relative placement of the electrodes and the permittivity of the fluid 2 surrounding them. In general, the capacitance moreover depends on the geometry and the permittivity distribution of the well. Since the sensitivity of the electrodes 6 is reduced when the distance from the electrodes is increased, the sensitivity matrix also has to be determined. When the geometry is fixed, any changes measured in the capacitance must be caused by the permittivity distribution alone and, thus, by a change in the flow.

For a known permittivity distribution, calculation of the capacitance using Gauss' Law on integral form is straightforward. By a permittivity distribution is meant the permittivity value at each point in two-dimensional space. The permittivity distribution can thus be represented as an image. For a homogeneous permittivity distribution, the capacitance is $$C_{ij} = \frac{1}{u_0} \oint_j \epsilon_0 \nabla u_i \cdot dl$$

where $C_{ij}$ is the capacitance between electrodes i and j, $\epsilon_0$ is the homogeneous permittivity, $u_i$ is the electric field when electrode i is activated, and $u_0$ is the amplitude of the excitation signal. The integral is closed around electrode j.

The value of the capacitance will change if the permittivity is changed. When providing a small and very localised perturbation in the permittivity, the sensitivity of the capacitance at each point can be determined. At some points, a change will affect the capacitance more than at others.

A sensitivity matrix can be calculated directly from the electric field of each electrode 6. Based on the sensitivity matrix, the changes in capacitance can be approximated from the permittivity distribution using the following equation:

$$\delta C_{ij} = S_{ij} \cdot \delta \epsilon$$

The above equation is the forward problem in determining the change of capacitance if the permittivity change is known. Since the permittivity distribution, i.e. the image, is the unknown variable, the inverse problem must be solved in order to determine the permittivity distribution and thus create the image showing the flow in cross-section.

Figure 12:
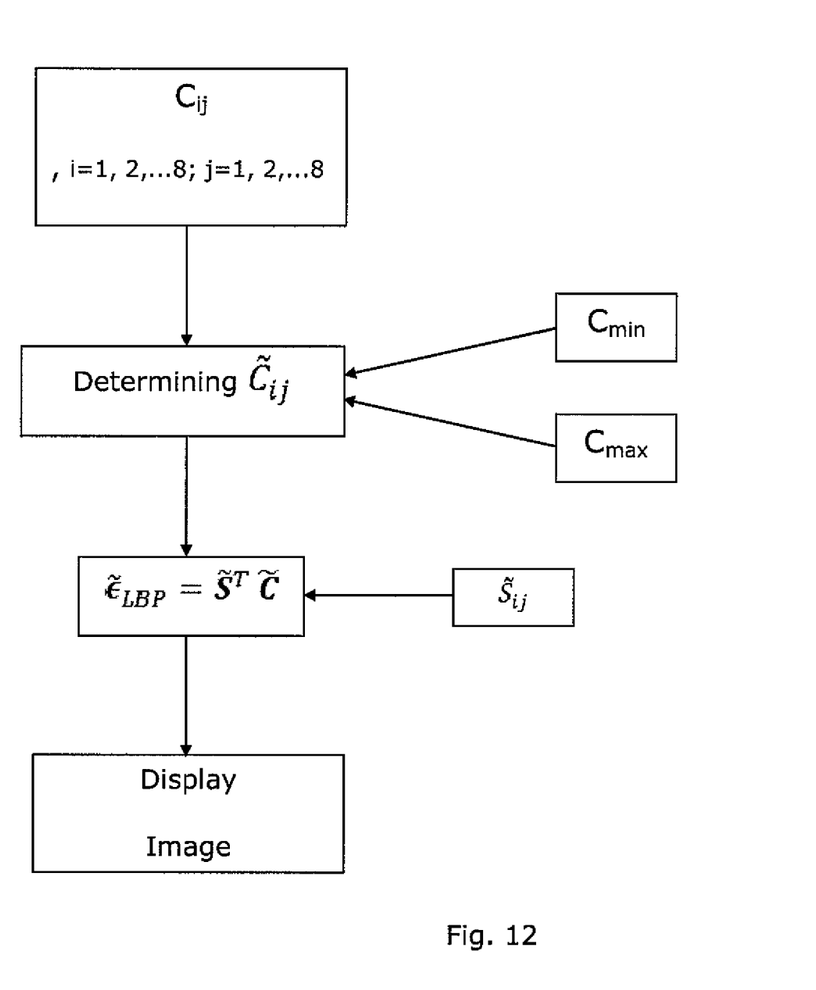
FIG. 12 shows a flow chart of the method for determining a permittivity profile of a cross-sectional view of a fluid in the annulus surrounding the tool.

In order to create an image of the flow almost simultaneously with the measurements provided by the tool, Linear Back Projection (LBP) may be employed as an immediate solution to the inverse problem, providing a very good approximation of the flow. The method for determining the image or the permittivity profile of a cross-sectional view of a fluid in an annulus surrounding the tool is shown in the flow chart of FIG. 12. However, a more precise determination can be calculated on the basis of the same measurements when needed.

One way of constructing a tomogram is done on the basis of a set of $$\frac{(N-1)N}{2}$$

capacitance measurements. The set is acquired by applying the excitation to one electrode, selecting a measuring electrode. The output voltage of the charge transfer circuit is then measured 32 times. The sum of those 32 measurements is considered a 'capacitance value'. When a complete set has been measured, the set is sent to over the wireline for topside processing.

At the topside, the set is combined with calibration data to create a normalised capacitance set:

$$\tilde{c} = \frac{c - c_{min}}{c_{max} - c_{min}}$$

The normalised capacitance is combined with the pre-calculated and normalised sensitivity matrix to create a tomogram.

The starting point for the calculation of a sensitivity matrix, S, is a simulation of the electric potential, inside the sensor, from a single electrode. The potential can be calculated via finite difference or finite elements methods, or even as an analytical solution to the governing partial differential equation. Whichever method is chosen, the electric field can be calculated as the gradient of the potential.

Because of the rotational symmetry of the sensor, the electric field from electrode j can be found by rotating the field from electrode i by $$\frac{(j-i)\pi}{N}$$

radians (it the electrodes are numbered in a counter-clockwise direction).

With a pixel basis, the sensitivity at the point k can thus be calculated from the electric fields by $$S_{ijk} = a_k \nabla u_i(x_k, y_k) \cdot \nabla u_j(x_k, y_k).$$

where $a_k$ is the area of the k'th pixel and $u_j$ is just a rotated version of $u_i$.

Apart from a rotation, there are only N−1 distinct of these inner products. The entire set of $$\frac{(N-1)N}{2}$$

sensitivity matrices can be obtained by rotations of the N−1 first ones.

In a rotationally symmetric sensor, it is thus possible to calculate the entire set of sensitivity matrices from the electric field of just one of the electrodes.

In LBP, two calibration sets ($\epsilon_{min}$, $C_{min}$) and ($\epsilon_{max}$, $C_{max}$) are required for normalising measurements and normalising the sensitivity matrix below. By a calibration set is meant a set of 28 capacitances (in case of eight electrodes 6) measured with a known distribution—e.g, when the annular space between the electrodes and the casing wall 4 is filled only with air or only with water.

$$\tilde{S}_{ijk} = \frac{S_{ijk}}{\sum_k S_{ijk}}$$

$$\tilde{C}_{ij} = \frac{C_{ij} - C_{min}}{C_{max} - C_{min}}$$

$$\tilde{\epsilon}_k = \frac{\epsilon_k - \epsilon_{min}}{\epsilon_{max} - \epsilon_{min}}$$

An index, k, has been added to explicitly show how each set of pixels in the sensitivity matrices are normalised. $C_{min}$ may be the capacitance when only gas is present between the electrodes 6 and the wall 4, and $C_{max}$ may be the capacitance when only water is present. When three phases, such as gas, oil, and water, is present, the calibration in order to determine $C_{min}$ and $C_{max}$ is still performed on only gas and water, respectively. The reason for this is that the capacitance of gas is the lowest and that of water the highest.

The normalised permittivity is approximated with a matrix equation and the LBP solution becomes:

$$\tilde{\epsilon}_{LBP} = \tilde{S}^T \tilde{C}$$

Using this approach, a fast and simple approximation of the permittivity distribution may be achieved and an image representing the permittivity distribution may be created. The images typically appear somewhat smeared and accurate reproduction of small details cannot be expected. However, more accurate images can be created based on the measurements when needed. One way of creating a more accurate tomogram is known as the Landweber method.

More sophisticated methods employ different approaches to minimise the residual of the forward problem:

$$\epsilon_{DIP} = \mathrm{argmin}_\epsilon |C - S\epsilon|$$

This typically involves an iterative solution where the initial guess at the image is given by the LBP solution. Examples of popular choices are Landweber and Tikhonov regularisation. Independent of which of the above methods are used, the result is an approximation of the permittivity distribution in the well.

Figure 2:
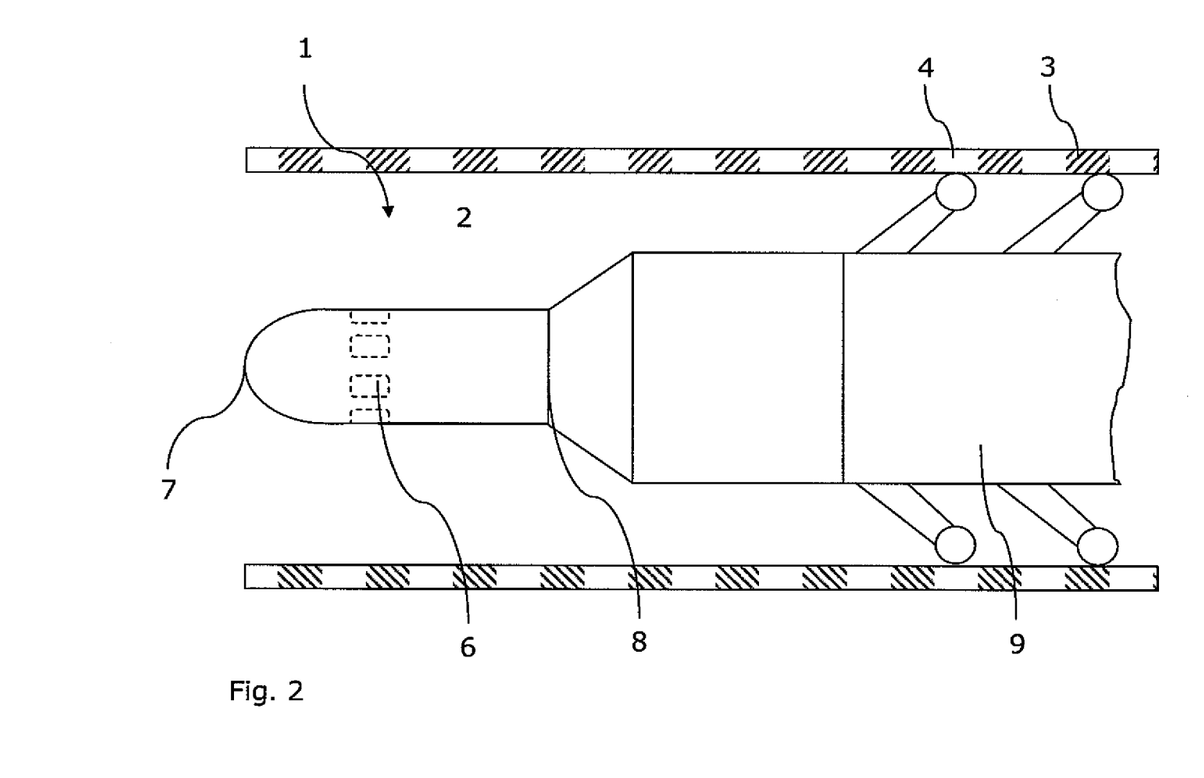
FIG. 2 shows a logging tool according to the invention in a well.

FIG. 2 shows a logging tool 1 having a tip 7 and a longitudinal extension extending from the tip towards the driving unit 9. As can be seen, the logging tool 1 is surrounded by well fluid 2 and the electrodes 6 are situated in the front of the tool. In FIG. 2, the electrodes 6 are arranged at a distance from the tip 7 of the tool of less than 20% of the total length L of the logging tool, preferably less than 10%, and more preferably less than 5%. The logging tool 1 is connected with the driving unit 9 in a connection joint 8. When the electrodes 6 are arranged near the tip 7 of the tool, the flow measured by the electrodes is substantially unaffected and the measurements are thus more precise. When the electrodes 6 are positioned at the previously mentioned distance from the tip 7, the driving unit 9 does not disturb the fluid 2 surrounding the tip and the electrodes.

Figure 3:
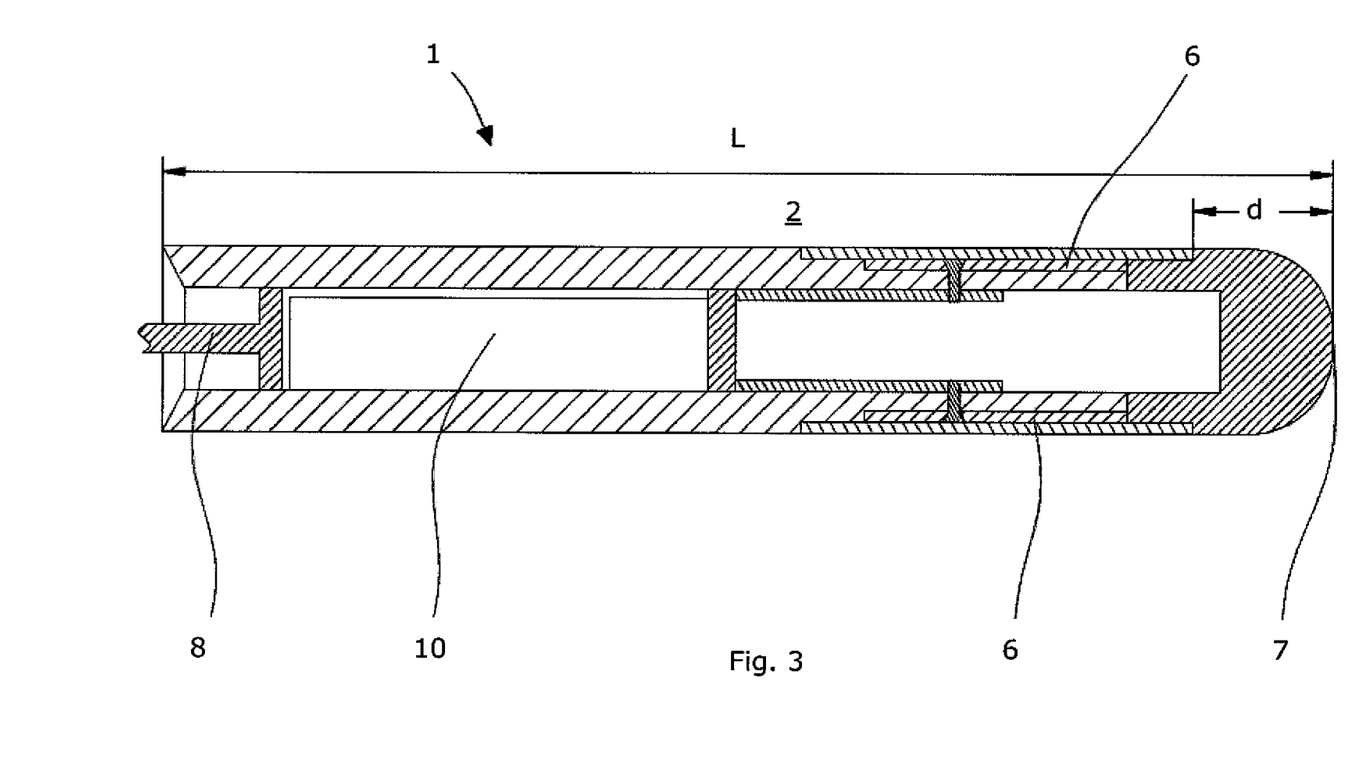
FIG. 3 shows a partly cross-sectional view of the logging tool along the longitudinal extension of the tool.
Figure 4:
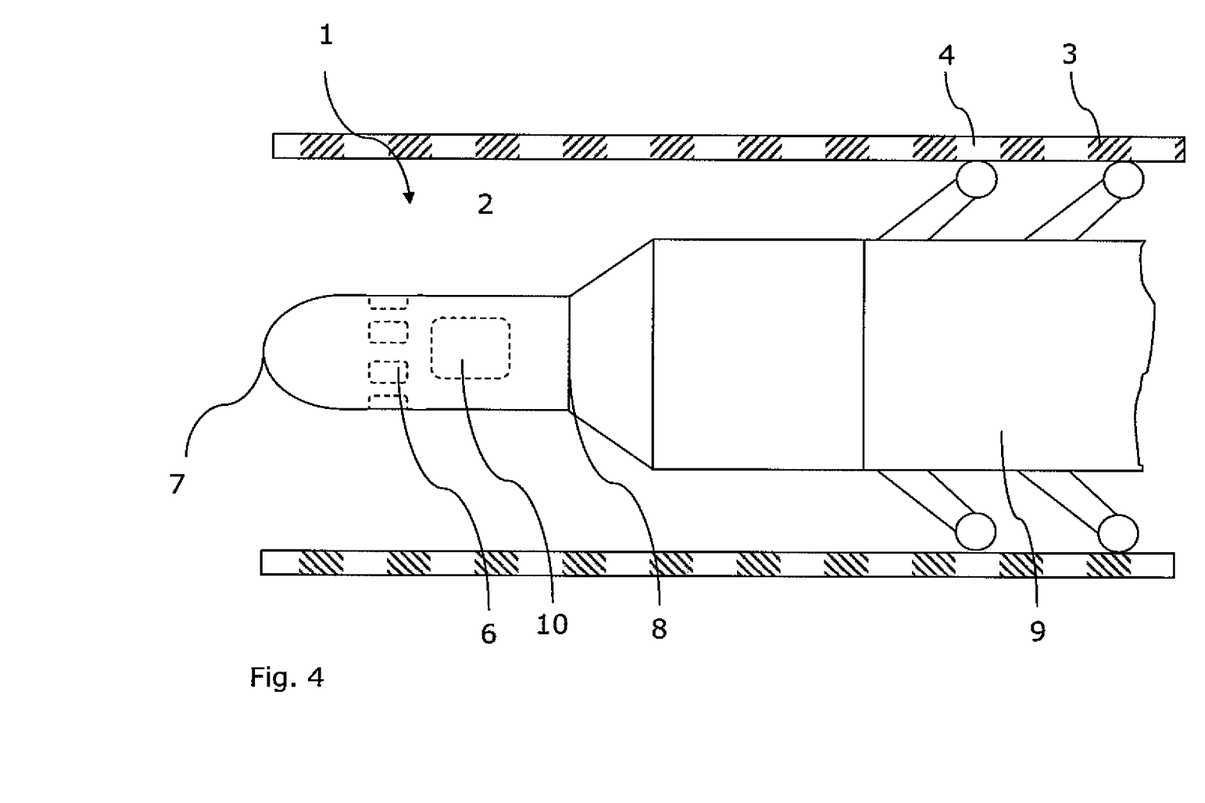
FIG. 4 shows another embodiment of the logging tool according to the invention in a well.

As mentioned, the logging tool 1 may be connected with a driving unit 9, such as a downhole tractor, as shown in FIGS. 2 and 4. When a leak is detected, the capacitance measurements of the logging tool 1 do not give the position of the leak. To be able to determine the position of the leak, the logging tool 1 thus has to comprise a positioning device 10. When the position of the leak has been determined, the leak may be sealed by inserting a patch or liner. The driving unit 9 can be used as positioning device as the speed with which the driving unit moves is known—by measuring the time it takes for the driving unit to reach the position of the leak, the position of the leak can be calculated. However, the positioning device 10 may also be some other kind of detection means, such as a casing collar locator, comprised in the logging tool 1, as shown in FIGS. 3 and 4.

When the patch has been inserted to seal off the leak, the logging tool can be submerged into the well again to confirm that the patch has been positioned correctly and thus that the leak has been sealed.

Prior art logging tools do not have a positioning device 10 and, thus, a separate positioning tool is required to determine the position of a leak. When using prior art logging tools, measurements are performed for every ten feet and the position is calculated as an interval based on the number of measurements. Experience has shown that the patch used to seal the leak must have a length of at least 150 feet to make sure that it covers the leak.

When the logging tool 1 has a positioning device 10, the patch used for sealing off a leak can be substantially smaller and the risk of having to place one patch on top of another, thus decreasing the internal diameter of the well, is substantially reduced.

A cross-sectional view along the longitudinal extension of the tool 1 is shown in FIG. 3, in which the electrodes 6 are positioned near the tip 7 of the tool at a distance d from the tip. The logging tool 1 has a length L and the electrodes are positioned at a distance of less than 15% of the length L from the tip 7.

The electrodes 6 are positioned in the periphery 5 of the logging tool. Outside the electrodes 6, a dielectric material is arranged forming a sleeve between the well fluid 2 and the electrodes. The tool 1 comprises a printing circuit (not shown). To improve the conductivity, the electrodes 6 are directly electrically connected to the printing circuit by means of screws instead of by means of a cord.

Figure 5:
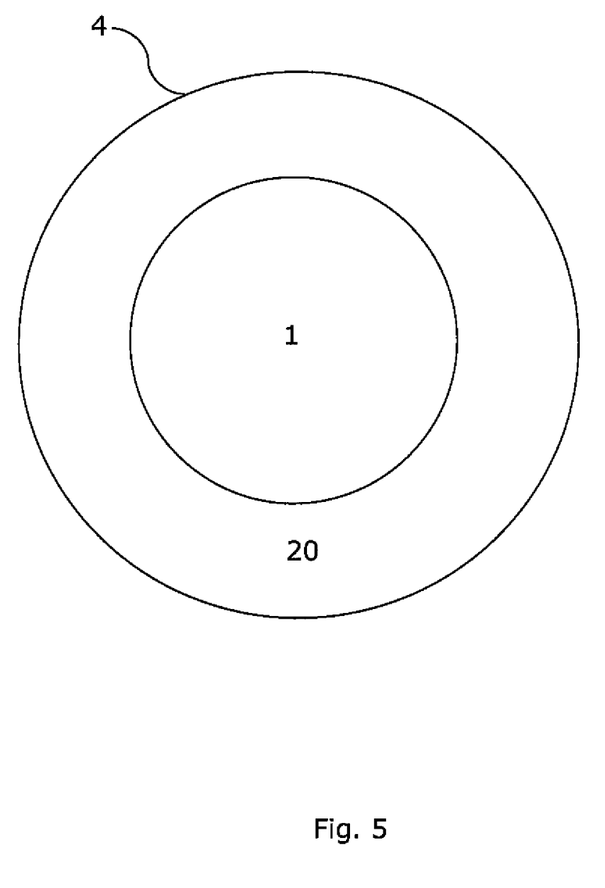
FIG. 5 shows an image illustrating a casing filled with gas.
Figure 6:
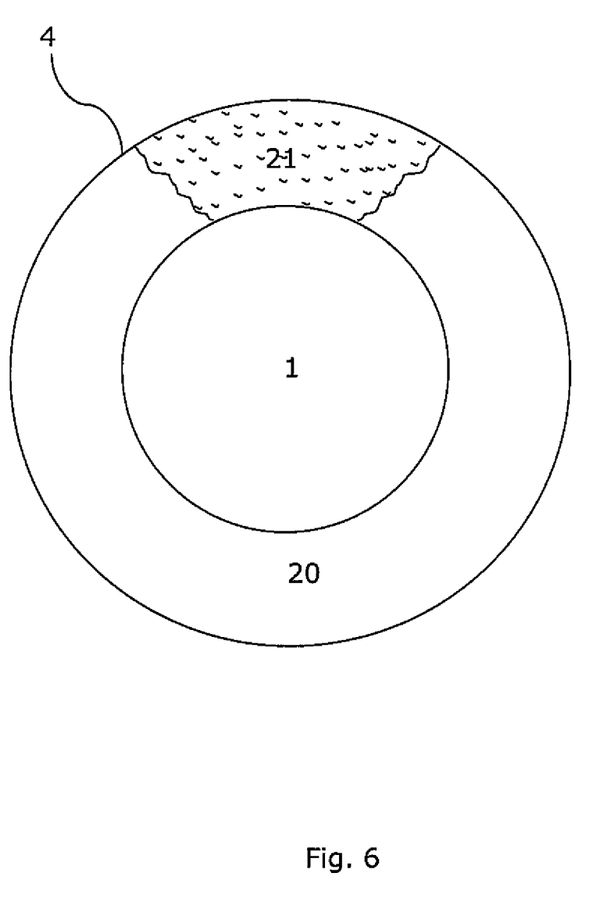
FIG. 6 shows an image illustrating water flowing into the casing from a leak in the casing.
Figure 8:
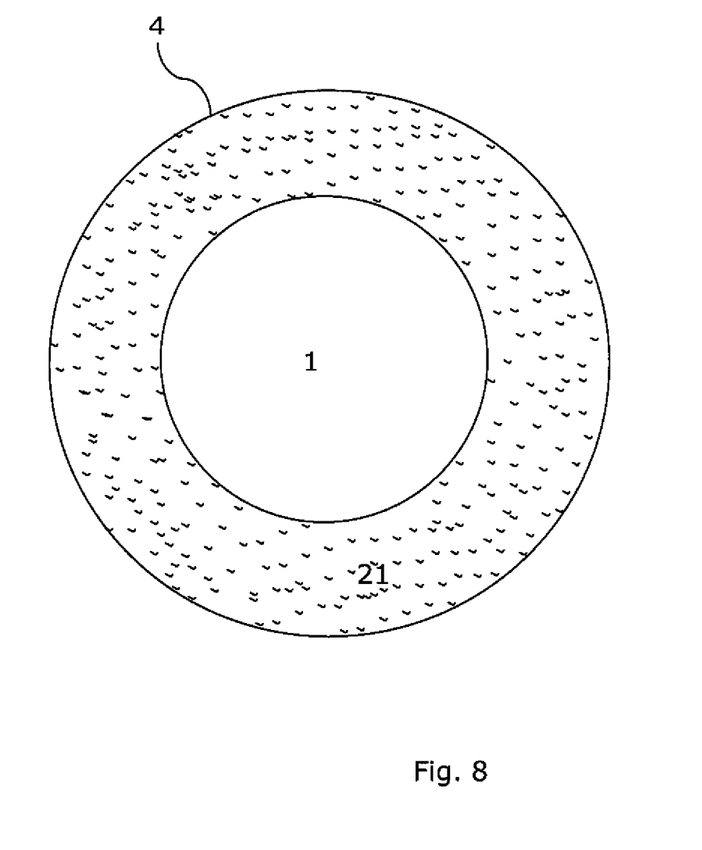
FIG. 8 shows an image illustrating a casing filed with water.
Figure 9:
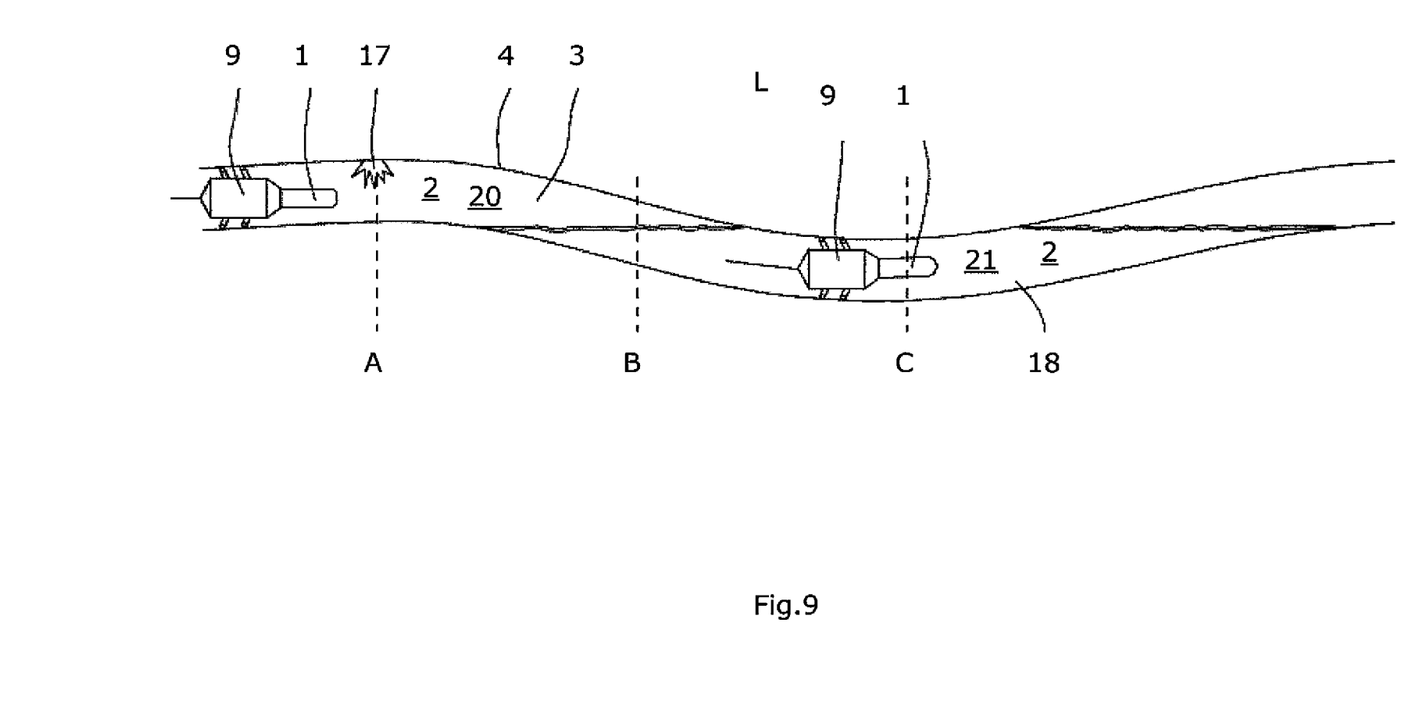
FIG. 9 shows a logging tool according to the invention in a well winding through the subsoil or substratum.

As described, an image is created from the capacitance measurements. In the images shown in FIGS. 5-8, the logging tool 1 has entered a well filled with gas 20 and, at some point, the tool moves past a leak flushing the well with water 21. The logging tool 1 has been tested in a gas similar to the gas in the well, and the permittivity distribution for that gas is thus known. Similarly, the logging tool 1 has been tested in oil and water. FIG. 5 shows an image created from some of the early measurements, from which it can be seen that the fluid surrounding the logging tool 1 is only gas. Later on, the logging tool 1 passes a leak 17 as shown in FIGS. 6 and 9 (indicated by the dotted line A in FIG. 9). From the image of FIG. 6 it can be seen that the permittivity has changed in an area of the fluid 2, and from test results it can be determined that the second phase of fluid must be water.

Figure 7:
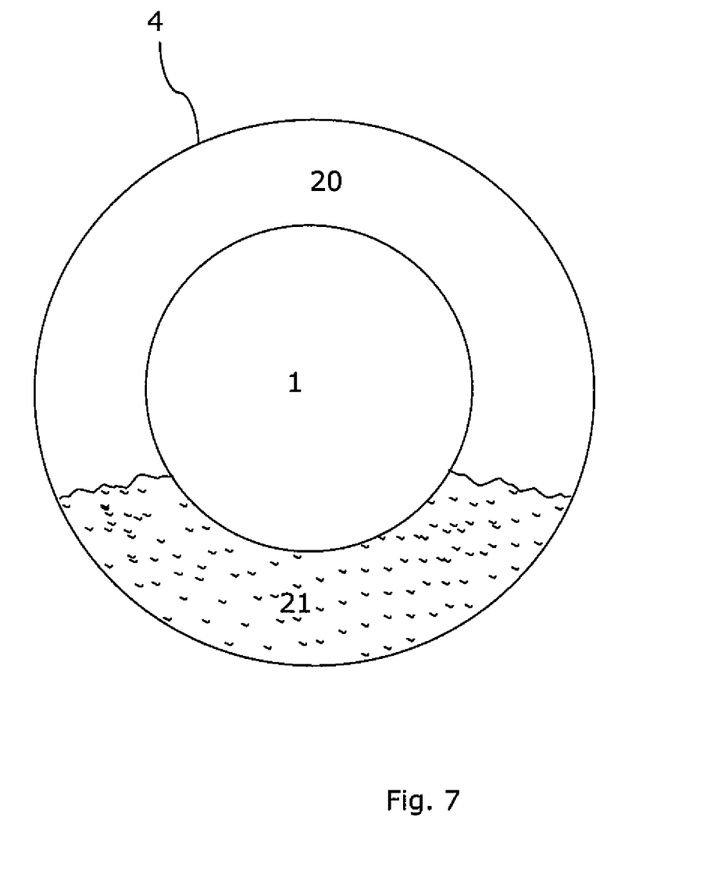
FIG. 7 shows an image illustrating how the water has moved to the bottom of the casing at a distance from the leak of FIG. 6.

From the image of FIG. 7, it can be seen how the second fluid phase has come to take up a larger portion of the fluid 2 and has changed position, as water flowing in through a leak 17 in the top of the casing 3 will fall to the bottom of the casing and remain there. This is also shown in FIG. 9 (indicated by the dotted line B). The image of FIG. 8 shows that the logging tool 1 has reached a position in the well where water has filled up the whole area. This is also shown in FIG. 9 (indicated by the dotted line C). The casing 3 is not straight, but usually winds its way through the subsoil as shown in FIG. 9. Pockets 18 may thus occur which may, as in this case, be filled with water. However, to seal off the leak 17 and prevent the water from entering, it is necessary to determine the position of the leak, not just the position in which most water is present.

Figure 10:
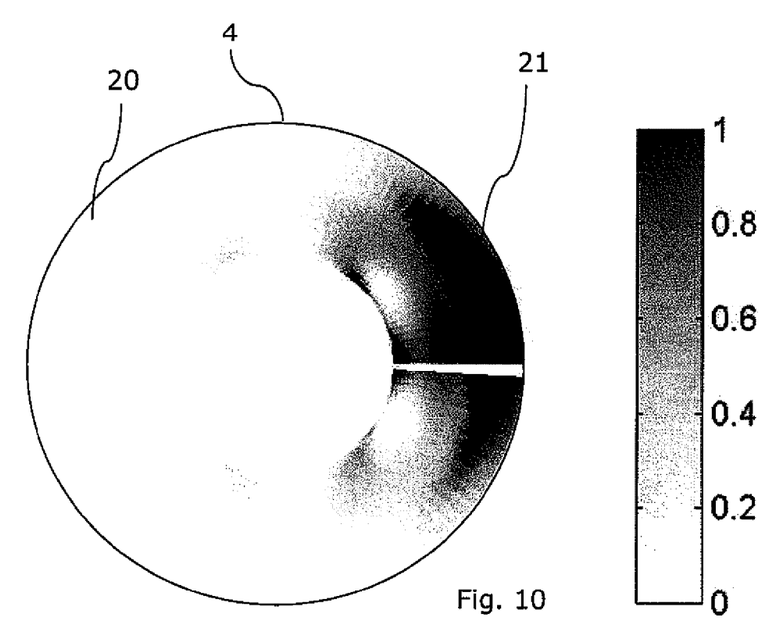
FIGS. 10 and 11 show images or tomograms illustrating a casing filled with gas and a water bobble.
Figure 11:
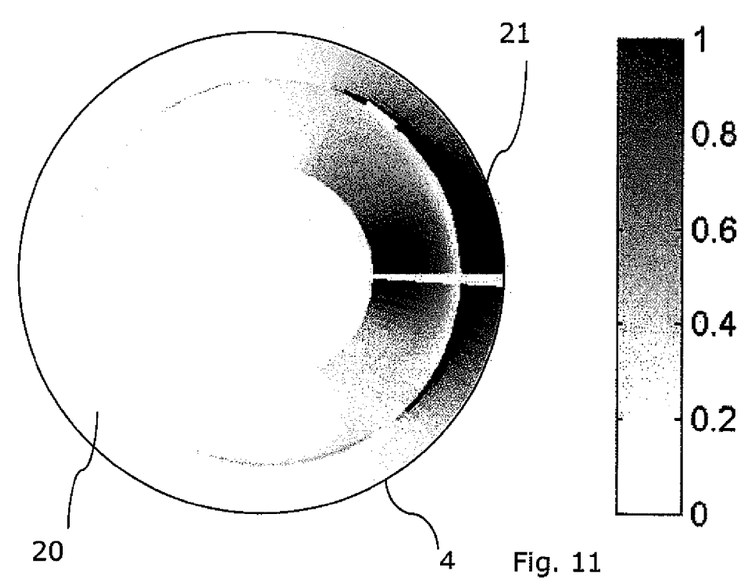

FIGS. 10 and 11 each show a cross-sectional tomogram or image of the casing filled with gas comprising a water bubble. The water bubble is indicated by the black area and the gas by the white areas. The image of FIG. 10 has been generated using the fast LBP method, whereas the image of FIG. 11 has been generated using the slower, more accurate Landweber method.

An orientation device, such as an accelerometer, can be provided in the logging tool 1 to help determine the orientation of the logging tool. However, the orientation device can be dispensed with as the orientation of the logging tool 1 is usually the same whether in a vertical stretch and/or a horizontal stretch of the well.

By a continuous measurement of the capacitance between the electrodes is meant a sample rate of at least $n*(n-1)/2$ capacitance measurements per second for n electrodes, more preferably $2*n*(n-1)/2$ capacitance measurements per second for n electrodes, and even more preferably $10*n*(n-1)/2$ capacitance measurements per second for n electrodes.

By a representation of $\in_{LBP}$ on a data storage media is meant either the measured data in itself or the data normalised using some sort of factor.

By fluid or well fluid 2 is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a casing 3 is meant all kinds of pipes, tubings, tubulars, liners, strings etc. used downhole in relation to oil or natural gas production.

In the event that the tools are not submergible all the way into the casing 3, a downhole tractor can be used to push the tools all the way into position in the well. A downhole tractor is any kind of driving tool capable of pushing or pulling tools in a well downhole, such as a Well Tractor®.

The invention claimed is:

1. A logging tool for determining properties of a fluid surrounding the tool arranged downhole in a casing comprising a wall and having a longitudinal extension, the logging tool having a substantially longitudinal cylindrical shape with a longitudinal axis and, when seen in cross-section, a periphery, wherein the logging tool comprises:
   a plurality of electrodes arranged spaced around the longitudinal axis in the periphery of the tool so that the fluid flows between the electrodes and the casing wall, wherein the tool is free of grounded electrical means or electrical means having a fixed potential arranged as guards between the electrodes; and
   the logging tool configured to measure the capacitance of the fluid surrounding the outside of the tool between two electrodes in all combinations giving n*(n−1)/2 capacitance measurements for n electrodes.

2. The logging tool according to claim 1, wherein the logging tool has a space between every two electrodes, which space is substantially filled up with a non-conductive means, the non-conductive means is made of a substantially non-conductive material and/or a non-conductive gas.

3. The logging tool according to claim 1, further comprising a positioning device for determining a position of the logging tool along the longitudinal extension of the casing.

4. The logging tool according to claim 3, wherein the positioning device is a driving unit.

5. The logging tool according to any claim 1, further comprising a centralisation device for centralising the logging tool in the casing.

6. The logging tool according to claim 5, wherein the centralisation device is a driving unit.

7. The logging tool according to claim 1, wherein the electrodes are arranged in a front end of the tool at a distance from a tip of the tool of less than 25% of a total length of the tool.

8. The logging tool according to claim 1, further comprising an orientation device for determining an orientation of the tool in the casing.

9. The logging tool according to claim 8, wherein the orientation device is an accelerometer.

10. The logging tool according to claim 1, wherein the tool comprises at least eight electrodes.

11. The logging tool according to claim 1, wherein the means for measuring provides a continuous measurement of the capacitance between the electrodes.

12. The logging tool according to claim 1, wherein the means for measuring measures a capacitance between two electrodes at a rate of at least 1 measurement of the capacitance per second.

13. The logging tool according to claim 1, wherein the measurement of the capacitance between two electrodes is performed at a potential (V) over two electrodes and with a frequency of at least 1 MHz.

14. The logging tool according to claim 1, further comprising a printing circuit directly connected with the electrodes without the use of cords or cables.

15. The logging tool according to claim 3, wherein the electrodes are positioned between the tip of the tool and the positioning device.

16. A method for using a logging tool for determining properties of a fluid surrounding the tool arranged downhole in a casing comprising a wall and having a longitudinal extension, the logging tool having a substantially longitudinal cylindrical shape with a longitudinal axis and, when seen in cross-section, a periphery, wherein the logging tool comprises a plurality of electrodes arranged spaced around the longitudinal axis in the periphery of the tool so that the fluid flows between the electrodes and the casing wall, wherein the tool is free of grounded electrical means or electrical means having a fixed potential arranged as guards between the electrodes, and the logging tool configured to measure the capacitance between two electrodes in all combinations giving n*(n−1)/2 capacitance measurements for n electrodes, the method comprising the steps of:
measuring the capacitance of the fluid surrounding the outside of the tool between two electrodes,
calculating the permittivity distribution, and
creating an image of the fluid flowing around the tool as a cross-sectional view transverse to the longitudinal extension of the tool.

17. A method for using a logging tool for determining properties of a fluid surrounding the tool arranged downhole in a casing comprising a wall and having a longitudinal extension, the logging tool having a substantially longitudinal cylindrical shape with a longitudinal axis and, when seen in cross-section, a periphery, wherein the logging tool comprises a plurality of electrodes arranged spaced around the longitudinal axis in the periphery of the tool so that the fluid flows between the electrodes and the casing wall, wherein the tool is free of grounded electrical means or electrical means having a fixed potential arranged as guards between the electrodes, and the logging tool configured to measure the capacitance between two electrodes in all combinations giving n*(n−1)/2 capacitance measurements for n electrodes, the method comprising the steps of:
measuring the capacitance of the fluid surrounding the outside of the tool between two electrodes,
calculating the permittivity distribution from the following equations and Linear Back Projection:

$$\tilde{S}_{ijk} = \frac{S_{ijk}}{\sum_k S_{ijk}}$$

$$\tilde{C}_{ij} = \frac{C_{ij} - C_{min}}{C_{max} - C_{min}}$$

$$\tilde{\epsilon}_{LBP} = \tilde{S}^T \tilde{C}$$

wherein $S_{ijk}$ is a sensitivity at a point k in a set of points, $$\tilde{S}_{ijk} = \frac{S_{ijk}}{\sum_k S_{ijk}}$$

is a normalized sensitivity for each point k in the set of points, $C_{ij}$ is the capacitance between the two electrodes, $C_{min}$ is the capacitance when only gas is present between the two electrodes and the wall, $C_{max}$ is the capacitance when only water is present between the two electrodes and the wall, $$\tilde{C}_{ij} = \frac{C_{ij} - C_{min}}{C_{max} - C_{min}}$$

is a normalized capacitance between the two electrodes, $\tilde{\epsilon}_{LBP}$ is a normalized permittivity distribution, $\tilde{\epsilon}_{LBP} = \tilde{S}^T \tilde{C}$ is a sensitivity matrix, and $\tilde{\epsilon}_{LBP} = \tilde{S}^T \tilde{C}$ is a normalized capacitance, and
creating an image of the fluid flowing around the tool as a cross-sectional view transverse to the longitudinal extension of the tool.

18. A method for determining a permittivity profile of a cross-sectional view of a fluid in an annulus using an electrode arrangement in the form of a set of electrodes arranged along a periphery of a cylindrical logging tool, comprising the steps of:
making a set of capacitance measurements constituted by one capacitance measurement for each combination of two electrodes from the set of electrodes,
determining the permittivity profile by:
providing a first calibration set ($\epsilon_{min}$, $C_{min}$) constituted by a set of capacitance measurements for each combination of two electrodes from the set of electrodes when the annulus is filled with a first known fluid, providing a second calibration set ($\in_{max}$, $C_{max}$) constituted by a set of capacitance measurements for each combination of two electrodes from the set of electrodes when the annulus is filled with a second known fluid different from the first known fluid, providing a sensitivity matrix associated with the electrode arrangement, and calculating the permittivity from the following equations:

$$\tilde{S}_{ijk} = \frac{S_{ijk}}{\sum_k S_{ijk}}$$

$$\tilde{C}_{ij} = \frac{C_{ij} - C_{min}}{C_{max} - C_{min}}$$

$$\tilde{\in}_{LBP} = \tilde{S}^T \tilde{C}$$

wherein $S_{ijk}$ is a sensitivity at a point k in a set of points, $$\tilde{S}_{ijk} = \frac{S_{ijk}}{\sum_k S_{ijk}}$$

is a normalized sensitivity for each point k in the set of points, $C_{ij}$ is the capacitance between the two electrodes, $C_{min}$ is the capacitance when only gas is present between the two electrodes and the wall, $C_{max}$ is the capacitance when only water is present between the two electrodes and the wall, $$\tilde{C}_{ij} = \frac{C_{ij} - C_{min}}{C_{max} - C_{min}}$$

is a normalized capacitance between the two electrodes, $\tilde{\in}_{LBP}$ is a normalized permittivity distribution, $\tilde{\in}_{LBP} = \tilde{S}_T \tilde{C}$ is a sensitivity matrix, and $\tilde{\in}_{LBP} = \tilde{S}_T \tilde{C}$ is a normalized capacitance.

19. The method according to claim 18, further comprising the step of:
creating an image based on the calculations.

20. The method according to claim 19, further comprising the step of:
storing the set of capacitance measurements constituted by one capacitance measurement for each combination of two electrodes from the set of electrodes on a data storage media.

21. The method according to claim 18, further comprising the step of:
storing $\tilde{\in}_{LBP}$ a data storage media.

22. The method according to claim 18, further comprising the step of:
storing a representation of $\tilde{\in}_{LBP}$ on a data storage media.

23. A detection system comprising the logging tool according to claim 1 and a calculation unit for processing capacitance measurements measured by the electrodes.

24. A downhole system comprising the logging tool according to claim 1 and a driving tool.

* * * * *